UNITED STATES PATENT OFFICE.

AUSTIN M. PURVES, OF PHILADELPHIA, PENNSYLVANIA, ASSIGNOR TO THE PENNSYLVANIA SALT MANUFACTURING COMPANY, OF SAME PLACE.

COMPOUND FOR DRYING AND PURIFYING AIR.

SPECIFICATION forming part of Letters Patent No. 552,142, dated December 31, 1895.

Application filed October 15, 1894. Serial No. 525,887. (Specimens.)

*To all whom it may concern:*

Be it known that I, AUSTIN M. PURVES, a citizen of the United States, residing in Philadelphia, county of Philadelphia, State of Pennsylvania, have invented a certain new and useful Improvement in Compounds for Drying and Purifying Air, of which the following is a true and exact description.

My invention relates to the purification and drying of air in ice-chests, closets, sick-rooms, or other places where it is desired that moisture and injurious gases should be eliminated.

The object of my invention is to provide a compound which can be cheaply sold and which will be efficient for the purposes mentioned and not objectionable in other respects; and my invention consists in a mixture or compound of chlorid of calcium and permanganate of potash. The chlorid of calcium has, as is well known, a strong affinity for water, and the permanganate of potash has well-known disinfecting properties. Neither material gives off objectionable odors or gases, and in admixtures they are found to preserve their natural properties unaltered and to materially assist each other in the work of drying and cleaning the air exposed to their action.

Preferably I use from one to five per cent. of permanganate of potash in the compound and effect the admixture by throwing crystals of the permanganate into a fused mass of the chlorid of calcium, stirring the materials together and then molding the compound into cakes of the desired size, the best method being to cast the molten compound into the boxes, cans, or crocks in which it is to be offered for sale, and in which it can be at once sealed up, for of course care must be taken to protect it from moisture and moist air until it is desired to use it.

The best and most efficient form in which the chlorid of calcium can be used is when all water is eliminated from it. Nevertheless the crystallized chlorid of calcium obtained from strong solutions and fused will be found to give good results, though preferably the temperatures at which the crystals are fused should be carried above 200° centigrade.

It will be understood that the well-known equivalent salts of potash and soda may be used in place of the permanganate of potash which I have specified above and found to give excellent results in practice.

Having now described my invention, what I claim as new, and desire to secure by Letters Patent, is—

1. As a compound for drying and purifying air a mixture of chlorid of calcium and permanganate of potash.

2. As a compound for drying and purifying air a molded cake of chlorid of calcium mixed with permanganate of potash.

AUSTIN M. PURVES.

Witnesses:
   H. J. PACK,
   EDW. I. AYRES.